US012373893B2

(12) United States Patent
Nguyen et al.

(10) Patent No.: US 12,373,893 B2
(45) Date of Patent: Jul. 29, 2025

(54) CHATBOT SYSTEM AND MACHINE LEARNING MODULES FOR QUERY ANALYSIS AND INTERFACE GENERATION

(71) Applicant: Allstate Insurance Company, Northbrook, IL (US)

(72) Inventors: Dao Nguyen, Huntersville, NC (US); Mark Gillespie, Craigavon (GB); Benjamin Hooper, Oak Park, IL (US); Mridu Kashyap, Elgin, IL (US); Keith Barzano, Carol Stream, IL (US)

(73) Assignees: Allstate Insurance Company, Northbrook, IL (US); Allstate Northern Ireland Limited, Belfast (GB)

( * ) Notice: Subject to any disclaimer, the term of this patent is extended or adjusted under 35 U.S.C. 154(b) by 0 days.

(21) Appl. No.: 17/855,184

(22) Filed: Jun. 30, 2022

(65) Prior Publication Data
US 2023/0004587 A1    Jan. 5, 2023

Related U.S. Application Data

(60) Provisional application No. 63/216,655, filed on Jun. 30, 2021, provisional application No. 63/216,706, (Continued)

(51) Int. Cl.
*G06F 16/00* (2019.01)
*G06F 7/00* (2006.01)
(Continued)

(52) U.S. Cl.
CPC ......... *G06Q 40/08* (2013.01); *G06F 16/3329* (2019.01); *G06F 16/358* (2019.01); *G06N 20/20* (2019.01); *H04L 51/02* (2013.01)

(58) Field of Classification Search
CPC ... G06F 16/358; G06F 16/3329; G06N 20/20; G06N 5/043; G06Q 40/08; H04L 51/02
(Continued)

(56) References Cited

U.S. PATENT DOCUMENTS

2015/0178849 A1\* 6/2015 Berger .................. G06Q 40/08
                                                        705/4
2019/0066031 A1\* 2/2019 Hancock ................. G06N 5/04
(Continued)

OTHER PUBLICATIONS

Gwendal Daniel et al. "Multi-platform Chatbot Modeling and Deployment with the Jarvis Framework", P. Giorgini and B. Weber (Eds.): CAiSE 2019 LNCS 11483, pp. 177-193 (2019).
(Continued)

*Primary Examiner* — Raquel Perez-Arroyo
(74) *Attorney, Agent, or Firm* — Dinsmore & Shohl LLP

(57) ABSTRACT

Aspects of the disclosure relate to using machine learning methods for chatbot selection. A computing platform may train a plurality of machine learning models, each corresponding to a chatbot. The computing platform may train an additional machine learning model to route queries to the plurality of machine learning models based on contents of the queries. The computing platform may receive a query, and may analyze the query using the additional machine learning model. The computing platform may route, based on the query analysis, the query to the plurality of machine learning models. The computing platform may generate, using the plurality of machine learning models, a response to the query. The computing platform may send the response to the query and one or more commands directing a client device to display the response to the query, which may cause the client device to display the response to the query.

19 Claims, 14 Drawing Sheets

Related U.S. Application Data filed on Jun. 30, 2021, provisional application No. 63/216,696, filed on Jun. 30, 2021, provisional application No. 63/216,673, filed on Jun. 30, 2021, provisional application No. 63/216,720, filed on Jun. 30, 2021.

(51) Int. Cl.
    *G06F 16/3329* (2025.01)
    *G06F 16/358* (2025.01)
    *G06N 20/20* (2019.01)
    *G06Q 40/08* (2012.01)
    *H04L 51/02* (2022.01)

(58) Field of Classification Search
    USPC .......................................................... 707/771
    See application file for complete search history.

(56) References Cited

U.S. PATENT DOCUMENTS

| | | | |
|---|---|---|---|
| 2020/0027095 A1* | 1/2020 | Cannon | G06Q 10/063116 |
| 2020/0234365 A1* | 7/2020 | Friedman | G06Q 30/0207 |
| 2020/0341970 A1* | 10/2020 | Rodrigues | H04L 51/02 |
| 2021/0081564 A1* | 3/2021 | Griffin | G06Q 10/06 |
| 2021/0083994 A1* | 3/2021 | Pan | G06F 18/24 |
| 2021/0201417 A1* | 7/2021 | Neumann | G16H 10/20 |
| 2021/0232614 A1* | 7/2021 | Su | G06N 5/025 |
| 2022/0300716 A1* | 9/2022 | Sabharwal | G06F 16/24578 |

OTHER PUBLICATIONS

Huda Khayrallah, et al. "SMRT Chatbots: Improving Non-Task-Oriented Dialog with Simulated Multiple Reference Training", arXiv:2011.00547v1 [cs.CL], pp. 1-17 (Nov. 1, 2020).

Ozoda Makhkamova, et al. "Deep Learning-based Multi-Chatbot Broker for Q&A Improvement of Video Tutoring Assistant", IEEE International Conference on Big Data and Smark Computing (BigComp), pp. 1-4, (2020).

Kuklenko, Julia "The Future of AI in Insurance", Services Technologies Case Studies Company, https://www.zfort.com/blog/future-of-ai-insurance, pp. 1-9 (Mar. 26, 2020).

Peart, Andy "AI Chatbots in Insurance: Benefits, Use Cases and Key Features", https://www.artificial-solutions.com/blog/ai-chatbots-insurance, pp. 1-12 (Oct. 6, 2020).

"Using Oracle Digital Assistant, A Built-In Components: Properties, Transitions, and Usage", https://docs.oracle.com/en/cloud/paas/digital-assistant/use-chatbot/built-components-properties-transitions-and-usage.html#GUID-E070399D-AA48..., pp. 1-103 (as early as Mar. 26, 2021).

"Functional UI—a Model-Based Approach", https://www.infoq.com/articles/functional-ui-model-driven-engineering/, pp. 1-34 (as early as Mar. 26, 2021).

"Design Knowledge bots", Microsoft Docs, https://docs.microsoft.com/en-us/azure/bot-service/bot-service-design-pattern-knowledge-base?view=azure-bot-service-4.0, pp. 1-14 (Dec. 13, 2017).

* cited by examiner

405

Assistance Interface

We were unable to automatically process the client's question. Please respond accordingly.

Client: What is covered under collision insurance?

Employee: ………

Query Response 510 Interface

Client: What is covered under collision insurance?

Virtual Assistant: Collision insurance helps pay to repair or replace your vehicle if it's damaged from: a collision with another vehicle, a collision with an object (fence, tree, etc.) or a single car accident that involves rolling/falling over. It does not cover damage to your vehicle not related to driving (hail, theft, etc.), damage to another person's vehicle, or medical bills (yours or another person's).

Enter text here

FIG. 5

CHATBOT SYSTEM AND MACHINE LEARNING MODULES FOR QUERY ANALYSIS AND INTERFACE GENERATION

CROSS-REFERENCE TO RELATED APPLICATIONS

The present disclosure claims priority to U.S. Provisional Nos. 63/216,673, 63/216,706, 63/216,655, 63/216,696, and 63/216,720, each filed Jun. 30, 2021, the entireties of which are incorporated by reference herein.

BACKGROUND

Aspects of the disclosure relate to processing systems. In particular, aspects of the disclosure relate to processing systems that train and apply machine learning models.

In some instances, enterprise organizations may use automated chatbots to respond to client queries. In these instances, however, a single chatbot may be configured to respond to all queries, and thus must be trained and subsequently maintained in a way that supports such widespread response capabilities. This may result in the bot being error prone and/or unable to respond to a large number of queries for which it does not have supporting information on which to base a response. Furthermore, this single bot method may result in processing inefficiencies, as it may take the bot a long period of time to access the relevant information and provide a response. Such shortcomings may limit or otherwise impact the utility of such chatbots in providing customer service.

Additionally, in some instances, chatbot query responses may be developed on a platform by platform basis. Accordingly, content changes may cause operational inefficiencies due to the process of coordinating/modifying underlying code and redeploying the modified content for a variety of platforms. This may further amplify the above described processing inefficiencies.

Furthermore, in many bot systems, a developer may programmatically implement a conversation flow within the bot systems. In these instances, however, when dialog flows are changed, codes relating to the entire development circle may require updates and redeployment. Such efforts may be further exacerbated if conversation flows are deployed in multiple channels (e.g., chat, voice, web, and/or other channels). Similar to the deficiencies described above, such methods may result in further processing and/or programming inefficiencies.

Today's chatbots further may be configured to programmatically implement conversation flows consisting of multiple questions to collect information prior to answering a user question. For example, these chatbots may provide a 1:1 relationship between questions and answers. Accordingly, this may result in inability of the chatbots to respond to a question if it is not properly worded, and/or may result in programming inefficiencies if new response information is added, and must be manually programmed into any corresponding responses.

SUMMARY

Aspects of the disclosure provide effective, efficient, scalable, and convenient technical solutions that address and overcome the technical problems associated with chatbot execution.

In accordance with one or more embodiments, a computing platform comprising at least one processor, a communication interface communicatively coupled to the at least one processor, and memory may train a plurality of machine learning models, where each of the plurality of machine learning models corresponds to a chatbot. The computing platform may train an additional machine learning model, which may configure the additional machine learning model to route queries to one or more of the plurality of machine learning models based on contents of the queries. The computing platform may receive, from a client device, one or more queries. The computing platform may analyze the one or more queries using the additional machine learning model. The computing platform may route, based on the query analysis, the one or more queries to one or more of the plurality of machine learning models. The computing platform may generate, using the one or more of the plurality of machine learning models, one or more query responses. The computing platform may send, to the client device, one or more query responses and one or more commands directing the client device to display the one or more query responses, which may cause the client device to display the one or more query responses. The computing device may generate, based on the one or more queries and the one or more query responses, a customized output for a user of the client device. The computing device may send, to the client device, the customized output and one or more commands directing the client device to display the customized output, which may cause the client device to display the customized output.

In embodiments, the computing platform may receive an updated JSON object, and may update one of a plurality of machine learning models based on the updated JSON object, which might not affect the remaining models of the plurality of machine learning models. In doing so, the computing platform may generate a conversation flow from a predefined configuration JSON object. This JSON object may be updated by an administrator, through a user experience, by a business analyst, and/or by other individuals and the conversation flow may be dynamically updated in real-time to reflect any changes. In doing so, no modifications to code or deployment process may be necessary. In some instances, this may define a separate conversation flow, which may be outside the Bot systems described below. The conversation flow may be defined as content, and may be configurable rather than defined using program codes. For example, a dynamic handler flow may be created within the Bot systems described below. Accordingly, when the Bot systems understand a user intent, they will call a flow content application programming interface (API) to obtain a conversation flow configuration, and reply to a user query based on the configuration. Accordingly, if there are changes in business flow, content may change rather than requiring code modifications by developers, which may cause a hassle in product deployment. As a result, no programming skills are needed to create or update the chat/conversation flow.

In embodiments, the computing platform may generate, using the one or more of the plurality of machine learning models, a response to the query, which may include: 1) querying a content database that includes ground-truth content, 2) identifying a communication channel for which the response to the query is to be formatted, and 3) formatting the response to the query to include a version of the ground-truth content (e.g., factual data gathered from the real world in machine learning) that is formatted for the identified communication channel. The computing platform may send, to the client device, the response to the query and one or more commands directing the client device to display the response to the query, which may cause the client device to display the response to the query. The computing platform may generate analytics information based on interactions with the chatbots and may send one or more commands directing an enterprise user device to display the analytics information, which may cause the enterprise user device to display the analytics information.

In embodiments, the computing platform may analyze (e.g., parse) the query by identifying, using a first machine learning technique, a top level category corresponding to the query, and identifying, using a second machine learning technique, different than the first machine learning technique, at least one sub category corresponding to the query, where the first machine learning technique and/or the second machine learning technique may be selected based on accuracy of the corresponding machine learning technique in analyzing data corresponding to the top level category and the at least one sub category, respectively. The computing platform may route, based on the at least one sub category, the query to one or more of the plurality of machine learning models, each corresponding to a particular sub category. The computing platform may generate, using the one or more of the plurality of machine learning models, a response to the query. The computing platform may send, to the client device, the response to the query and one or more commands directing the client device to display the response to the query, which may cause the client device to display the response to the query.

In an embodiment, a chatbot system configured to display a customized output comprises a plurality of machine learning models and a plurality of chatbots, each of the plurality of machine learning models corresponding to a respective chatbot of the plurality of chatbots, a computing platform comprising a processor, a non-transitory computer-readable memory communicatively coupled to the processor, and machine-readable instructions stored in the memory. The machine-readable instructions, when executed by the processor, cause the processor of the computing platform to: receive a query comprising a content from a graphical user interface of a user of a client device as part of a conversation between the user of the client device and the computing platform, route the query to one or more selected models of the plurality of machine learning models based on the content of the query such that the query is routed to one or more selected chatbots of the plurality of chatbots, and generate a response to the query, using the one or more selected models and corresponding one or more selected chatbots, as part of the conversation between the user of the client device and the computing platform. The machine-readable instructions, when executed by the processor, further cause the processor of the computing platform to: automatically generate, based on the conversation between the user of the client device and the computing platform and the response to the query, the customized output for the user, the customized output for the user separate from the response to the query, and display the customized output for the user on the graphical user interface of the client device of the user.

In another embodiment, a chatbot system configured to display a customized output comprises a plurality of machine learning models and a plurality of chatbots, each of the plurality of machine learning models corresponding to a respective chatbot of the plurality of chatbots, a computing platform comprising a processor, a non-transitory computer-readable memory communicatively coupled to the processor, and machine-readable instructions stored in the memory. The machine-readable instructions, when executed by the processor, cause the processor of the computing platform to: receive a query comprising a content from a graphical user interface of a user of a client device as part of a conversation between the user of the client device and the computing platform, route the query to one or more selected models of the plurality of machine learning models based on the content of the query such that the query is routed to one or more selected chatbots of the plurality of chatbots, generate a response to the query, using the one or more selected models and corresponding one or more selected chatbots, as part of the conversation between the user of the client device and the computing platform, and display the response to the query on the graphical user interface. The machine-readable instructions, when executed by the processor, further cause the processor of the computing platform to: automatically generate, based on the conversation between the user of the client device and the computing platform and the response to the query, the customized output for the user, the customized output for the user separate from the response to the query, generate a prompt to the user on the graphical user interface requesting approval to display the customized output, and based on receiving approval from the user via the prompt on the graphical user interface, display the customized output for the user on the graphical user interface of the client device of the user.

In yet another embodiment, a method of operating a chatbot system, the chatbot system comprising a plurality of machine learning models and a plurality of chatbots, each of the plurality of machine learning models corresponding to a respective chatbot of the plurality of chatbots, and a computing platform, comprises: receiving a query comprising a content from a graphical user interface of a user of a client device as part of a conversation between the user of the client device and the computing platform. The method further comprises routing the query via the computing platform to one or more selected models of the plurality of machine learning models based on the content of the query such that the query is routed to one or more selected chatbots of the plurality of chatbots, generating a response to the query, using the one or more selected models and corresponding one or more selected chatbots, as part of the conversation between the user of the client device and the computing platform, and automatically generating, based on the conversation between the user of the client device and the computing platform and the response to the query, a customized output for the user, the customized output for the user separate from the response to the query.

In an embodiment, a chatbot system configured to analyze query data comprises a plurality of machine learning models and a plurality of chatbots, each of the plurality of machine learning models corresponding to a respective chatbot of the plurality of chatbots, and a computing platform comprising a processor, a non-transitory computer-readable memory communicatively coupled to the processor, and machine-readable instructions stored in the memory. The machine-readable instructions, when executed by the processor, cause the processor of the computing platform to, across at least one or more intelligent platforms, technical platforms, or combinations thereof: parse the query to identify at least a category and a sub-category corresponding to the query, and route the query to one or more selected models of the plurality of machine learning models based on the content of the query and the at least a category and a sub-category that are identified such that the query is routed to one or more selected chatbots of the plurality of chatbots. The machine-readable instructions, when executed by the processor, further cause the processor of the computing platform to:

generate a response to the query, using the one or more selected models and corresponding one or more selected chatbots, as part of a conversation between a user of a client device and the computing platform, and display the response to the query.

In another embodiment, a chatbot system configured to analyze query data comprises a plurality of machine learning models and a plurality of chatbots, each of the plurality of machine learning models corresponding to a respective chatbot of the plurality of chatbots, and a computing platform comprising a processor, a non-transitory computer-readable memory communicatively coupled to the processor, and machine-readable instructions stored in the memory. The machine-readable instructions, when executed by the processor, cause the processor of the computing platform to: receive a query comprising a content from a graphical user interface of a user of a client device as part of a conversation between the user of the client device and the computing platform, parse the query to identify at least a category and a sub-category corresponding to the query, route the query to one or more selected models of the plurality of machine learning models based on the content of the query and the at least a category and a sub-category that are identified such that the query is routed to one or more selected chatbots of the plurality of chatbots, generate a response to the query, using the one or more selected models and corresponding one or more selected chatbots, as part of the conversation between the user of the client device and the computing platform, and generate a prompt to the user on the graphical user interface requesting a rating of the response to the query. The machine-readable instructions, when executed by the processor, further cause the processor of the computing platform to: generate analytics based on the rating of the response to the query and historical data, and display the analytics on a graphical user interface of an enterprise client device.

In yet another embodiment, a method of operating a chatbot system to analyze query data, the chatbot system comprising a plurality of machine learning models and a plurality of chatbots, each of the plurality of machine learning models corresponding to a respective chatbot of the plurality of chatbots, and a computing platform, comprises receiving a query comprising a content from a graphical user interface of a user of a client device as part of a conversation between the user of the client device and the computing platform, parsing the query to identify at least a category and a sub-category corresponding to the query, and routing the query via the computing platform to one or more selected models of the plurality of machine learning models based on the content of the query and the at least a category and a sub-category that are identified such that the query is routed to one or more selected chatbots of the plurality of chatbots. The method further comprises generating a response to the query, using the one or more selected models and corresponding one or more selected chatbots, as part of the conversation between the user of the client device and the computing platform, and displaying the response to the query to the user on the graphical user interface of the client device of the user.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4-8 depict illustrative graphical user interfaces for using interconnected bot networks for task distribution in accordance with one or more example embodiments.

DETAILED DESCRIPTION

Figure 1A:
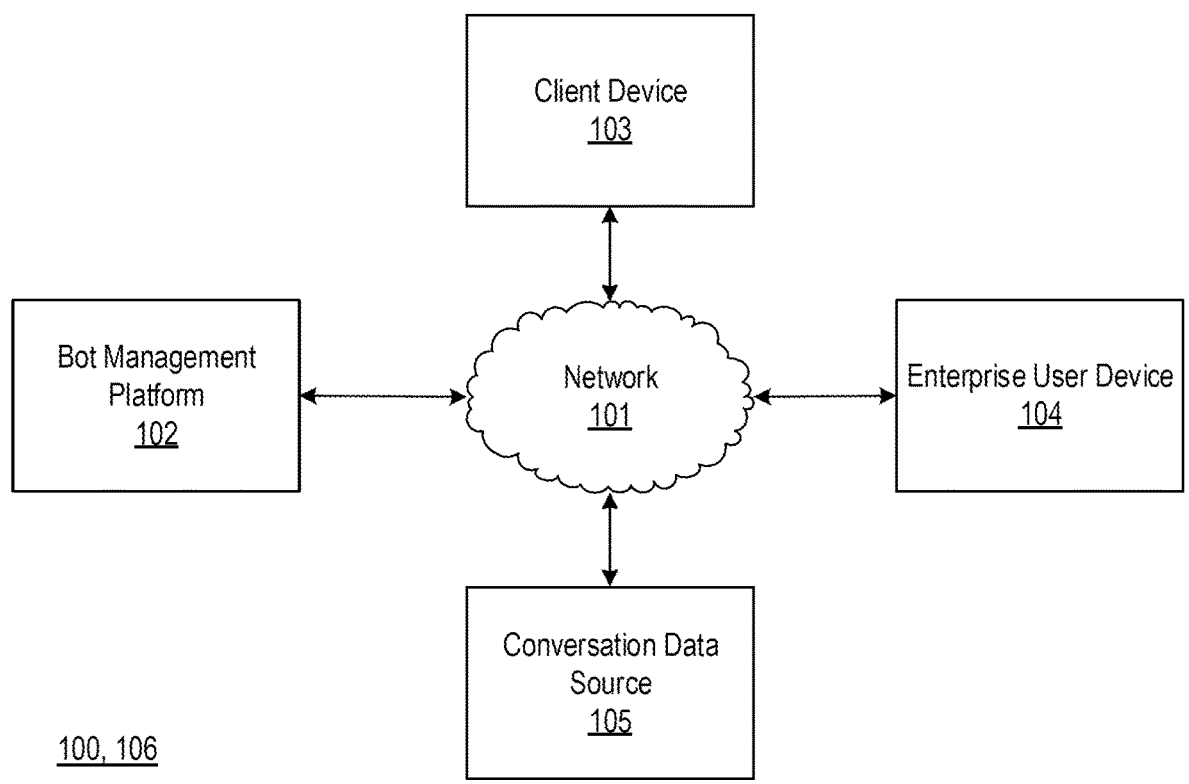
FIGS. 1A and 1B depict an illustrative computing environment using interconnected bot networks for task distribution in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further below, systems and methods for using interconnected bot networks to focus on task distribution are described. For example, many bot systems today use a monolithic bot, which may be trained with a large variety of conversations to solve multiple expert tasks. This may cause poor performance in natural language processing, and it may be difficult to maintain the training data. Furthermore, this may result in a poor user experience. Accordingly, in such a system, new training data must be added to retrain the entire system, and the models must be constantly re-evaluated, all of which may impact performance of intent identification and/or classification.

Accordingly, described herein are a system/method for decentralization of a bot into a network of topic oriented bots. Each bot may be trained to fulfill user's requests on a specific topic. A network may consist of a manager bot and a pool of skilled bots. The manager bot may detect a user's intent at a high level, and may route the request to a corresponding skilled bot. The assigned bot may then further process a deeper understanding on its subject, and fulfill the user's request accordingly. By training multiple expert bots managed by a single bot manager, training data may be separated per task, and the user experience may be tailored per customer.

A bot service application programming interface (API) may accept a user's question, and may classify the question to identify a high level user intent. The service may be trained with a large dataset of utterances, which may be mapped to the high level categories. Once an intent is detected, the service may pass on to a router bot to route the request to a skilled bot. For example, a user question may be "what is covered under collision coverage?" In this example, the high level topic may be "knowledge base." The manager bot may maintain a list of skilled bot names, mapped to the top level category, and corresponding endpoint classification APIs (e.g., "knowledge base" intent is mapped to "KB" bot name, and the endpoint for KB bot is "directory #1." The manager bot may route the request to a corresponding endpoint to fulfill the user's request. Skilled bots may accept a user's question, and classify the details, topics, entities, and/or other information to fulfill the user's request. For example, if the user question is "what is covered under collision coverage?," the classification may be coverage details, and the entity may be collision coverage.

Furthermore, many conversation systems today, such as chat and/or voice platforms, may develop answers for their customers within their specific platforms. Accordingly, when the content changes, it may be a long process to coordinate/change codes, and to redeploy the content in each platform. Accordingly, it may be advantageous to keep content as a separate component outside of engagement layers (chat, voice, Web, and/or other layers) to decrease cost, and increase time efficiency and/or effectiveness in operation, while allowing content experts to maintain/update content without impacting front end layers. More specifically, described herein are systems/methods for centralized knowledge-based content and for dynamically transforming the content into platform specific formats to display or render. Such channels may include web, mobile, chat systems, voice systems, and/or other channels.

In addition, today, many bots programmatically implement conversation flow consisting of multiple questions to collect information before answering a user's question. As a result, operational overhead when contents are changed may be significant. For example, developers must manually change codes and/or implement changes throughout an entire development circle. As a specific example, a knowledge base may contain information about multiple coverages such as collision coverage and comprehensive coverage. The knowledge base may further contain information regarding what is not involved in each type of coverage for potential display. Each type of coverage may include information such as: how much is the deductible, whether it is optional or required coverage, what is covered, and/or other information. When customers ask, for example, "is collision coverage required," developers today may need to extract several entities such as coverage type, classify the user intent, and return a corresponding answer. If new content is added for collision coverage such as limitations, a developer may need to implement a new conversation flow to support a new limitation intent question, and go through an entire deployment process.

Accordingly, described herein is a knowledge base and education bot that uses multi-layered taxonomy conversation understanding to address such deficiencies. For example, content may be organized in a hierarchical structure. For example, collision coverage general information may include information such as "a coverage that helps pay to repair or replace your car if it's damaged in an accident with another vehicle or object, such as a fence or tree." Then, collision coverage optional/required information may include "if you're leasing or financing your car, collision coverage may be required by the lender. If your car is paid off, collision coverage may be optional." The bot may classify text and return a multiple layer category, which may include using training data with multiple classes to train the bot to identify top level categories and one or more subcategories. For example, the bot may identify a top level category of "information," based on the above query, and then may identify a sub-level category of "is required." In some instances, each parent category may have a corresponding configuration file, and each sub-category may correspond to an endpoint API.

In some instances, a manager bot may be used to distribute tasks to configured endpoints for further classification. In these instances, multiple endpoint URLs may allow application of different NLP and/or machine learning algorithms based on the amount of utterances and/or other information so as to achieve the most accurate performance.

Figure 1B:
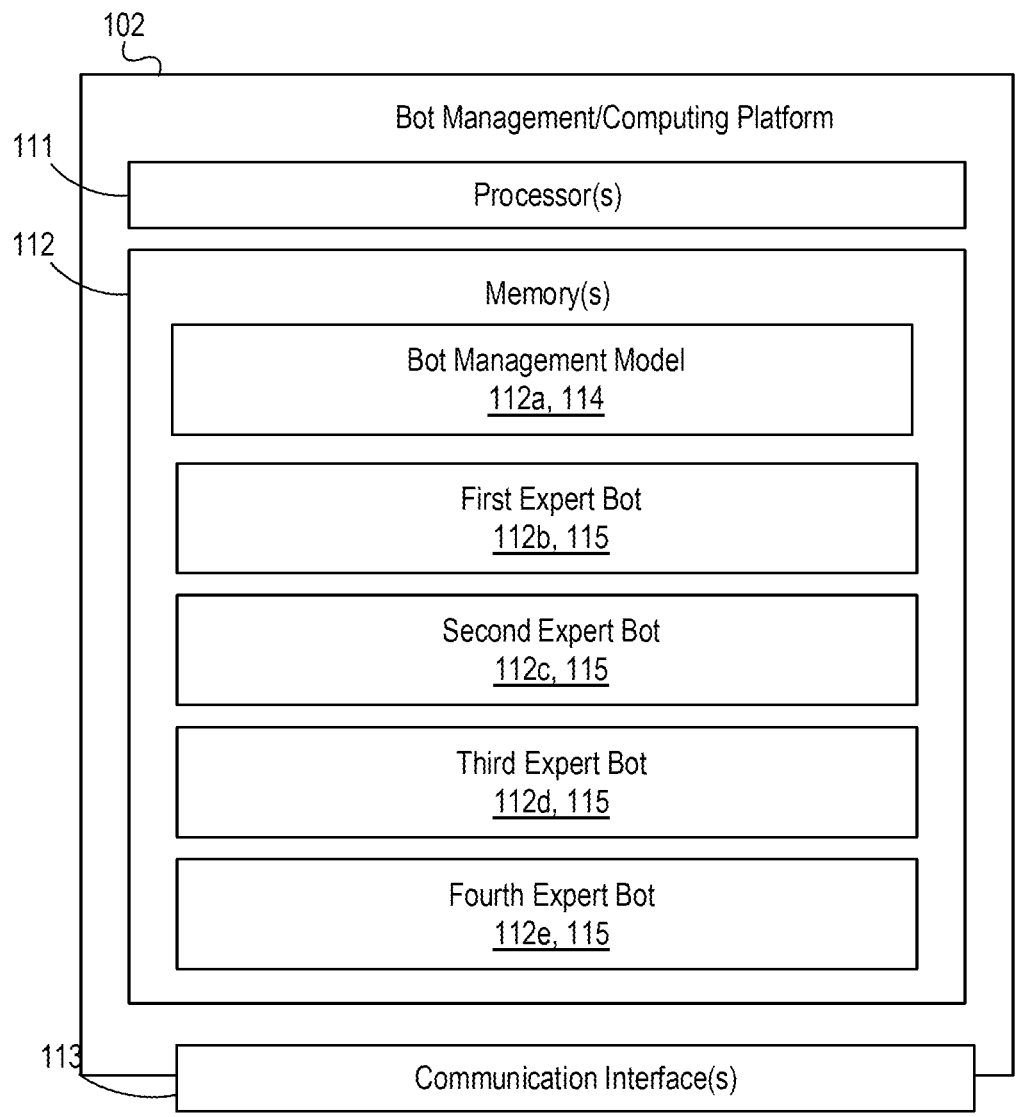

FIGS. 1A and 1B depict an illustrative computing environment for using interconnected bot networks for task distribution in accordance with one or more example embodiments. Referring to FIG. 1A, computing environment 100 may include one or more computer systems. For example, computing environment 100 may include a bot management platform 102, a client device 103, an enterprise user device 104, and a conversation data source 105.

As illustrated in greater detail below, bot management platform 102 may include one or more computing devices configured to perform one or more of the functions described herein. For example, bot management platform 102 may include one or more computers (e.g., laptop computers, desktop computers, servers, server blades, or the like) and/or other computer components (e.g., processors, memories, communication interfaces). In addition, and as illustrated in greater detail below, bot management platform 102 may be configured to apply one or more natural language processing and/or machine learning methods to select appropriate models for query processing, and subsequently process the queries accordingly using the selected models.

Client device 103 may be a computing device (e.g., smartphone, tablet, desktop computer, laptop computer, or other personal computing device) that may be used by an individual (e.g., a customer of an enterprise organization, such as an insurance provider). In some instances, the client device 103 may be used to display identity chatbot interfaces and/or other alerts/graphical user interfaces.

Enterprise user device 104 may be a computing device (e.g., smartphone, tablet, desktop computer, laptop computer, or other personal computing device) that may be used by an enterprise user (e.g., an employee of an enterprise organization, such as a customer service representative for an insurance provider). In some instances, the enterprise user device 104 may be used to display chatbot interfaces and/or other alerts/graphical user interfaces.

Conversation data source 105 may be or include one or more computing devices (e.g., servers, server blades, and/or other devices) configured to store historical and current conversation data (e.g., between clients and chatbots/customer service representatives). For example, conversation data source 105 may be configured to store user queries, responses to these queries, information indicating whether or not the response successfully answered the queries, and/or other information.

Computing environment 100 also may include one or more networks, which may interconnect one or more of bot management platform 102, client device 103, enterprise user device 104, conversation data source 105, and/or one or more other systems, public networks, sub-networks, and/or the like. For example, computing environment 100 may include a network 101.

In one or more arrangements, bot management platform 102, client device 103, enterprise user device 104, conversation data source 105 and/or the other systems included in computing environment 100 may be any type of computing device capable of receiving a user interface, receiving input via the user interface, and/or communicating the received input to one or more other computing devices. For example, the systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of bot management platform 102, client device 103, enterprise user device 104, and/or conversation data source 105 may, in some instances, be special-purpose computing devices configured to perform specific functions.

Referring to FIG. 1B, bot management platform 102 may include one or more processors 111, memory 112, and communication interface 113. A data bus may interconnect processor 111, memory 112, and communication interface 113. Communication interface 113 may be a network interface configured to support communication between bot management platform 102 and one or more networks (e.g., network 101, or the like). Memory 112 may include one or more program modules having instructions that when executed by processor 111 cause bot management platform 102 to perform one or more functions described herein and/or one or more databases that may store and/or otherwise maintain information which may be used by such program modules and/or processor 111. In some instances, the one or more program modules and/or databases may be stored by and/or maintained in different memory units of bot management platform 102 and/or by different computing devices that may form and/or otherwise make up bot management platform 102. For example, memory 112 may have, store, and/or include a bot management model 112a and one or more expert bots (e.g., first expert bot 112b, second expert bot 112c, third expert bot 112d, fourth expert bot 112e, or the like). Bot management model 112a may have instructions that direct and/or cause bot management platform 102 to train, maintain, and deploy a machine learning model 114 for expert or other chatbot 115 selection, as discussed in greater detail herein. The expert bots 115 may each correspond to a unique machine learn model 114, which may be trained as an expert on a particular topic (e.g., knowledge base, quotes, account help, customer services, and/or other topics)

Figure 2A:
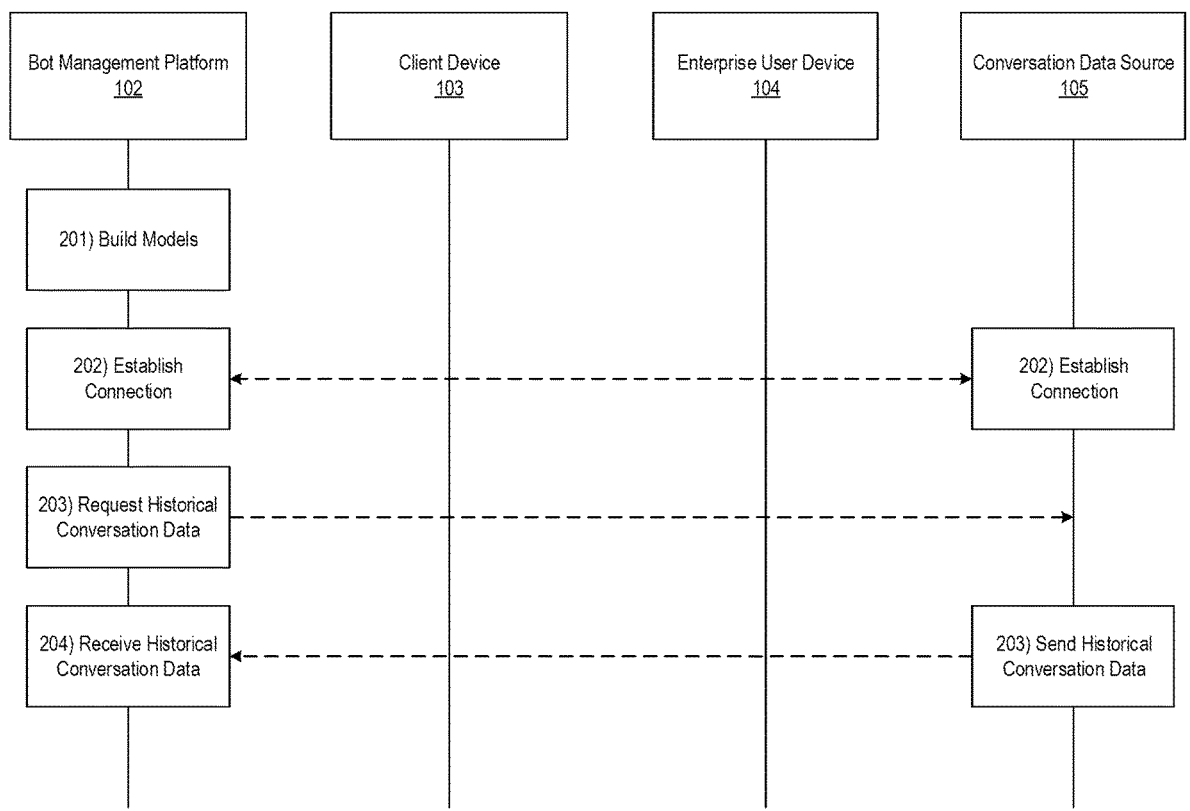
FIGS. 2A-2H depict an illustrative event sequence for using interconnected bot networks for task distribution in accordance with one or more example embodiments.

FIGS. 2A-2E depict an illustrative event sequence for using interconnected bot networks for task distribution in accordance with one or more example embodiments. Referring to FIG. 2A, at step 201, the bot management platform 102 may build a model (e.g., that may subsequently be trained) that may be configured to support dynamic and configurable bot conversations. For example, the bot management platform 102 may build a model that moves bot conversation flow into a content-oriented component, which may allow individuals to create conversations without actually programming codes. In some instances, to do so, the bot management platform 102 may create and/or host a non-structured query language (SQL) conversation database. For example, the bot management platform 102 may maintain one or more JavaScript object notation (JSON) objects, which may be used to match responses to received queries. For example, the bot management platform 102 may host a core conversation service, which may be used by the models to retrieve a list of rules to identify user intent. This list of rules may be used to provide a query response per the methods described herein. In some instances, one or more of the JSON objects received may enable the bot management platform 102 to pre-train one or more models without the need to obtain additional training data.

At step 202, the bot management platform 102 may establish a first wireless data connection with the conversation data source 105. For example, the bot management platform 102 may establish a first wireless data connection with the conversation data source 105 to link the bot management platform 102 to the conversation data source 105 (e.g., in preparation for requesting historical conversation data). In some instances, the bot management platform 102 may identify whether or not a connection is already established with the conversation data source 105. If a connection is already established with the conversation data source 105, the bot management platform 102 might not re-establish the connection. If a connection is not yet established with the conversation data source 105, the bot management platform 102 may establish the first wireless data connection as described herein.

At step 203, the bot management platform 102 may request historical conversation data from the conversation data source 105. For example, the bot management platform 102 may send a historical conversation data request via the communication interface 113 and while the first wireless data connection is established.

At step 204, the conversation data source 105 may send historical conversation data to the bot management platform 102. For example, the conversation data source 105 may send one or more chat data logs, voice session recordings (and/or corresponding transcripts), validation information (e.g., indicating whether or not responses to queries were positively or negatively received), and/or other information. In some instances, the conversation data source 105 may send the historical conversation data to the bot management platform 102 while the first wireless data connection is established.

At step 205, the bot management platform 102 may receive the historical conversation data sent at step 204. For example, the bot management platform 102 may receive the historical conversation data via the communication interface 113 and while the first wireless data connection is established. In some instances, as an alternative to or instead of collecting historical conversation data, the bot management platform 102 may collect industry knowledge, and may use this industry knowledge to create the models.

Figure 2B:
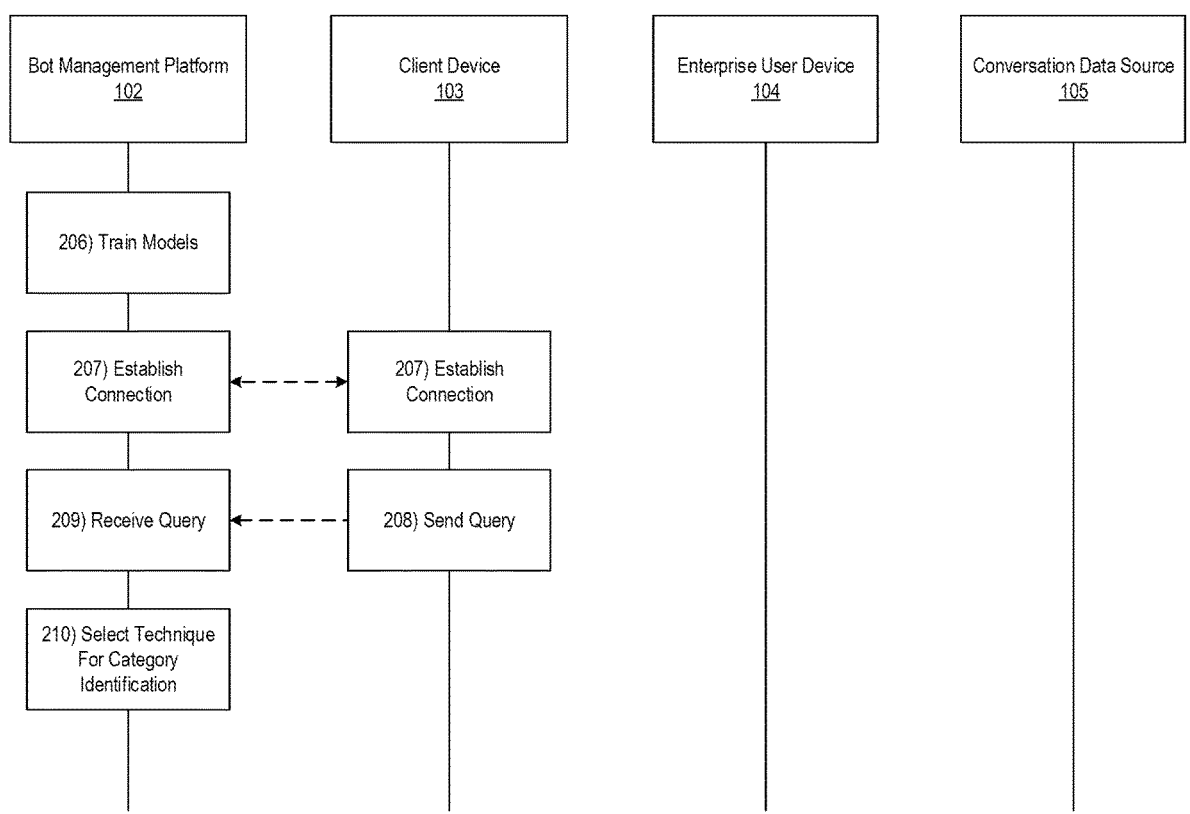

Referring to FIG. 2B, at step 206, the bot management platform 102 may train one or more machine learning and/or natural language processing models. For example, the bot management platform 102 may train bot management model 112a to parse queries, identify corresponding expert bots to respond to the queries, and route the queries accordingly. The bot management platform 102 may also train one or more expert models (e.g., first expert bot 112b, second expert bot 112c, third expert bot 112d, fourth expert bot 112e, and/or other models) to provide query responses related to particular topics (e.g., knowledge base, quotes, account help, customer services, and/or other topics). In some instances, the bot management platform 102 may train the different models using different machine learning techniques (i.e., whatever technique is best for the specific data supported by each model may be used to train that corresponding model—based on data quantity, data type, or the like).

At step 207, the client device 103 may establish a connection with the bot management platform 102. For example, the client device 103 may establish a second wireless data connection with the bot management platform 102 to link the client device 103 to the bot management platform 102 (e.g., in preparation for sending a query). In some instances, the client device 103 may identify whether or not a connection is already established with the bot management platform 102. If a connection is already established with the bot management platform 102, the client device 103 might not re-establish the connection. If a connection is not yet established with the bot management platform 102, the client device 103 may establish the connection as described herein.

At step 208, the client device 103 may send a query to the bot management platform 102. For example, the client device 103 may receive user input through a chatbot display/interface (e.g., a gesture input, voice input, text input, and/or other inputs), that may include one or more queries, and the client device 103 may send a query to the bot management platform 102 accordingly. As a particular example, the client device 103 may send a query such as "What is covered under collision coverage?" In some instances, the client device 103 may send the query to the bot management platform 102 while the second wireless data connection is established.

At step 209, the bot management platform 102 may receive the query sent at step 208. For example, the bot management platform 102 may receive the query via the communication interface 113 and while the second wireless data connection is established.

At step 210, the bot management platform 102 may parse the query received at step 209 to identify, at a high level, a user intent (e.g., a topic corresponding to the query). For example, the bot management platform 102 may use the bot management model to apply one or more machine learning and/or natural language processing techniques to identify an expert bot to which the query should be routed. For example, if the query was "What is covered under collision coverage," the bot management model may identify that a knowledge base expert bot may provide the most accurate response to the query.

In some instances, the bot management platform 102 may parse the query and identify multi-layer classes that may each correspond to a particular model (e.g., expert bot). For example, the bot management platform 102 may parse a query such as "is collision coverage required." Rather than having a queued 1:1 response to this question, the bot management platform 102 may classify this text to return a multi-layered category. To do so, in some instances, the bot management platform 102 may select a first machine learning technique to apply to identify a top level category corresponding to the query (e.g., based on accuracy of the corresponding technique in analyzing data corresponding to the given category (e.g., based on a number of utterances corresponding to the query or a portion of the query being used to identify the particular category, an amount of labelled data, an amount of unlabeled data, data type, and/or other reasons)).

By routing the queries to expert bots in this way, each expert bot may be trained more extensively on a particular subject than if a single bot was being used to cover a plurality of topics. In doing so, each given expert bot may be better configured to provide specific/accurate query responses than if a single bot were to be used. Furthermore, each expert bot may be deployed, updated, removed, and/or otherwise modified without impacting the remaining expert bots, and additionally processing speed may be increased.

In some instances, in identifying an expert bot, the bot management platform 102 may identify a confidence level corresponding to the given expert bot identification. The bot management platform 102 may compare this confidence level to a confidence threshold, and may, in some instances, only route the query to the identified expert bot if the confidence level exceeds the confidence threshold (e.g., proceed to step 211). If the bot management platform 102 identifies that the confidence level does not exceed the confidence threshold, the bot management platform 102 may proceed to step 219 to request manual assistance.

Figure 2C:
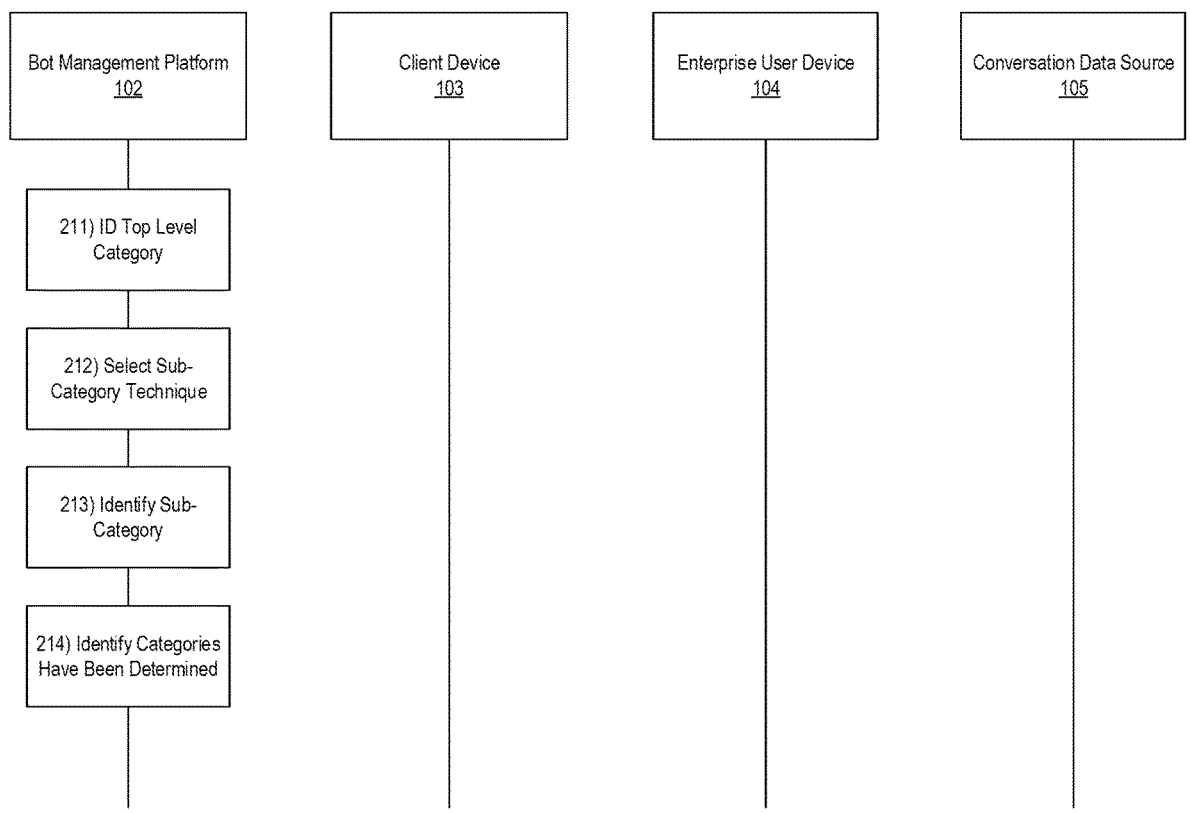

Referring to FIG. 2C, at step 211, the bot management platform 102 may use the technique selected at step 210 to identify a top level category. For example, the bot management platform 102 may identify first that the query is requesting general information about collision coverage.

At step 212, the bot management platform 102 may select a second machine learning technique to apply to identify a sub-category corresponding to the query (e.g., based on accuracy of the corresponding technique in analyzing data corresponding to the given category (e.g., based on a number of utterances corresponding to the query or a portion of the query being used to identify the particular category, an amount of labelled data, an amount of unlabeled data, data type, and/or other reasons)). In some instances, the bot management platform 102 may select a different technique to identify a sub-category than was used to identify the top level category at step 211.

At step 213, the bot management platform 102 may further identify a sub-category using the machine learning technique selected at step 212. For example, the bot management platform 102 may identify a sub-category of requirements (e.g., identifying whether or not something is optional or required).

In some instances, each parent category (e.g., general information) may have a corresponding configuration file, and each sub-category may correspond to an endpoint API (e.g., requirements). In some instances, the bot management platform 102 may use the identified sub-category to identify the appropriate expert bot to which the query is to be routed.

At step 214, bot management platform 102 may determine whether all categories have been identified. If not, the bot management platform 102 may return to step 212. If so, the bot management platform 102 may continue to step 213.

In some instances, in identifying these parent and/or sub-categories at steps 210-214, the bot management platform 102 may identify multiple sub-categories (e.g., instances in which the bot management platform 102 returns to step 212 from step 214), which may, in some instances, correspond to different expert bots. In these instances, the bot management platform 102 may route the query (or a portion of the query) to these multiple different expert bots for analysis.

In some instances, the bot management platform 102 may use one or more different machine learning techniques to identify each parent and/or sub-category as described above. For example, the bot management platform 102 may use a first machine learning technique to identify a parent category, a second machine learning technique to identify a first sub-category, and a third machine learning technique to identify a second sub-category.

In doing so, the bot management platform 102 may capture a holistic context of the query, and provide a more comprehensive response (e.g., as generated based on this context) than if a mere 1:1 question/response system were to be implemented.

Figure 2D:
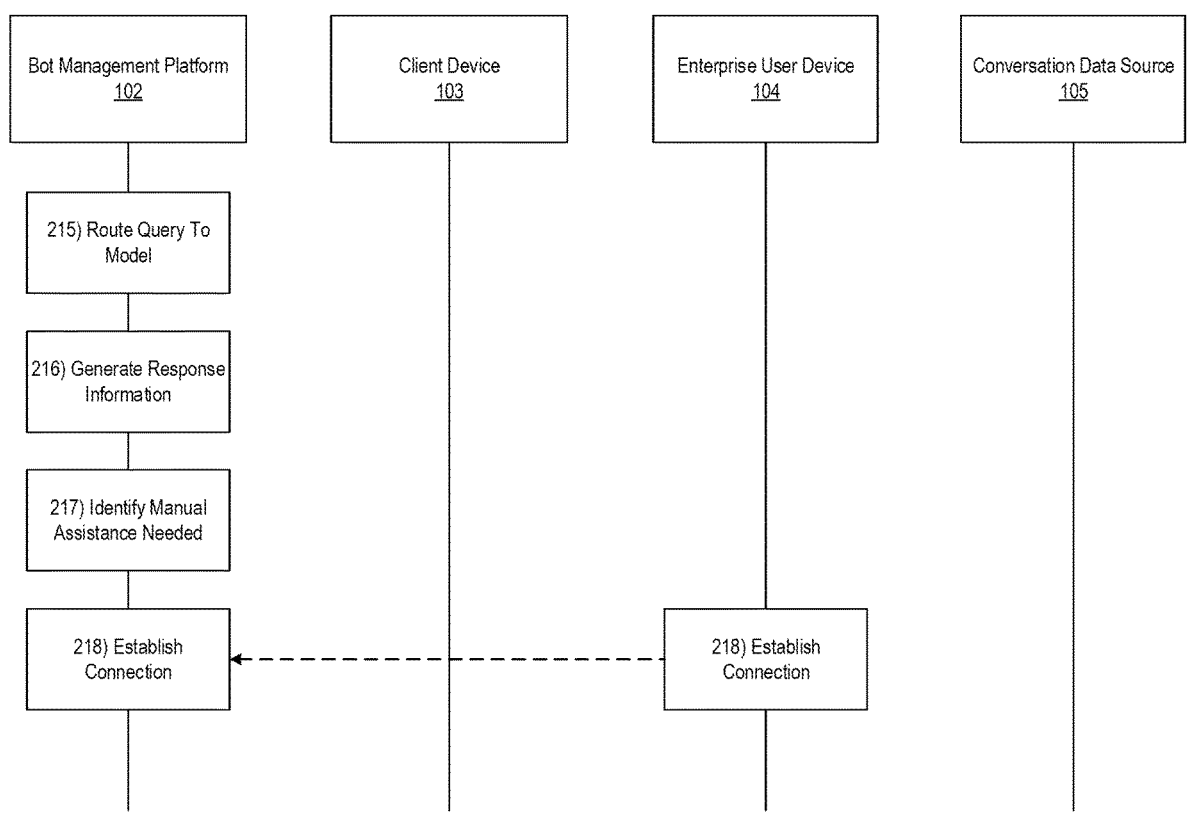

Referring to FIG. 2D, at step 215, the bot management platform 102 may use the bot management model to route the query to the expert bot identified at step 210. For example, to continue with the example described above, the bot management platform 102 may route the query to the knowledge base model.

In some instances, the bot management model may identify multiple expert models that may be used to respond to portions of the query. In these instances, the bot management model may route the query to multiple expert models. For example, in some instances, the bot management model may identify one or more sub categories, which may, in some instances, relate to different expert bots/models.

At step 216, the bot management platform 102 may generate response information (e.g., to the query) using the selected expert bot(s). For example, the bot management platform 102 may apply one or more machine learning techniques using the selected expert model to identify a response to the query. Continuing with the example described above, the bot management platform 102 may use the knowledge based expert bot to generate a response of "Collision insurance helps pay to repair or replace your vehicle if it's damaged from: a collision with another vehicle, a collision with an object (fence, tree, etc.) or a single car accident that involves rolling/falling over. It does not cover damage to your vehicle not related to driving (hail, theft, etc.), damage to another person's vehicle, or medical bills (yours or another person's)."

At step 217, the bot management platform 102 may identify whether the expert bots were able to generate a full response to the query. If so, the bot management platform 102 may proceed to step 225. If not, the bot management platform 102 may proceed to step 217.

At step 218, the bot management platform 102 may establish a connection with the enterprise user device 104. For example, the bot management platform 102 may establish a third wireless data connection with the enterprise user device 104 to link the bot management platform 102 to the enterprise user device 104 (e.g., in preparation for sending a request for assistance). In some instances, the bot management platform 102 may identify whether or not a connection is already established with the enterprise user device 104. If a connection is already established with the enterprise user device 104, the bot management platform 102 might not re-establish the connection. If a connection is not yet established with the enterprise user device 104, the bot management platform 102 may establish the third wireless data connection as described herein.

Figure 2E:
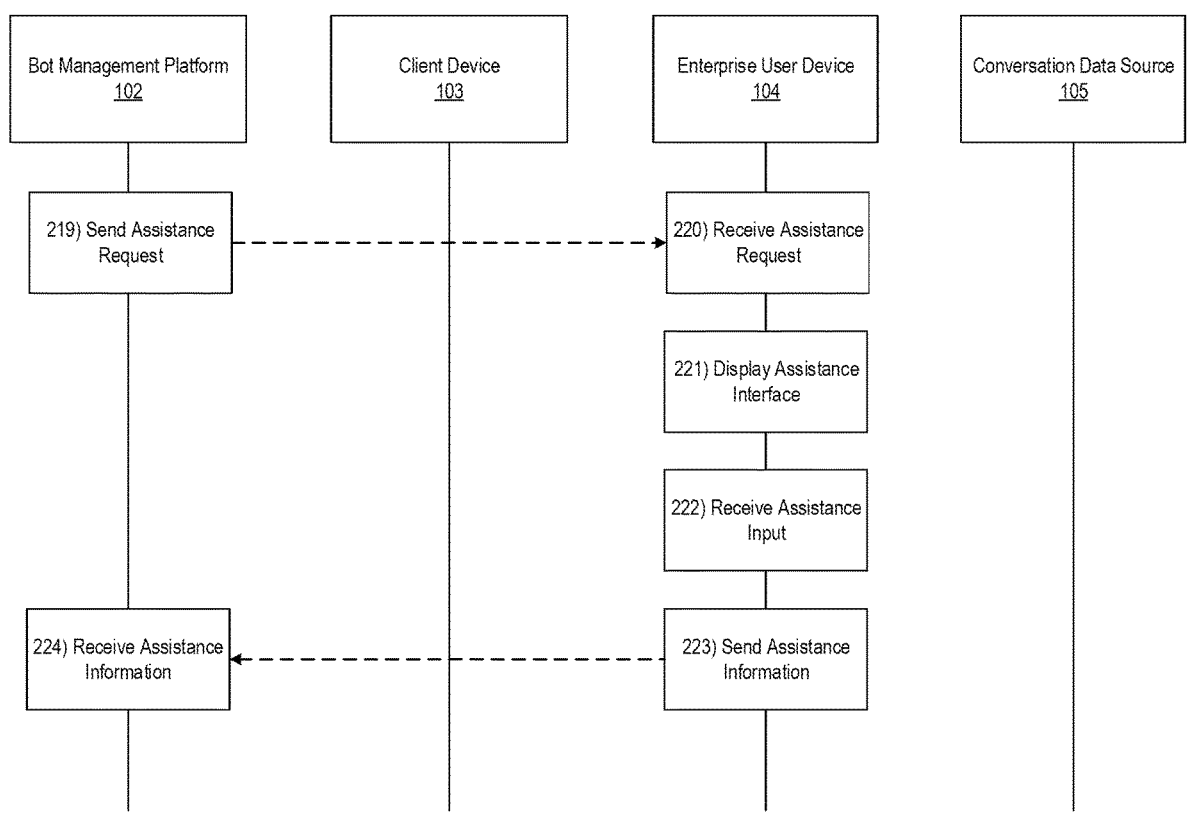

Referring to FIG. 2E, at step 219, the bot management platform 102 may send the assistance request to the enterprise user device 104. For example, the bot management platform 102 may send the assistance request to the enterprise user device 104 via the communication interface 113 and while the third wireless data connection is established.

At step 220, the enterprise user device 104 may receive the assistance request. For example, the enterprise user device 104 may receive the assistance request while the third wireless data connection is established.

At step 221, the enterprise user device 104 may display an assistance interface. For example, the enterprise user device 104 may display a graphical user interface similar to graphical user interface 405, which may prompt an enterprise user to provide a manual response or insight to inform the response to the query.

At step 222, the enterprise user device 104 may receive an assistance input. For example, the enterprise user device 104 may receive a text/touch input, a voice input, and/or other input that provides a response to the query.

At step 223, the enterprise user device 104 may send assistance information, based on the assistance input, to the bot management platform 102. For example, the enterprise user device 104 may send the assistance information to the bot management platform 102 while the third wireless data connection is established.

At step 224, the bot management platform 102 may receive the assistance information. For example, the bot management platform 102 may receive the assistance information via the communication interface 113 and while the third wireless data connection is established.

Figure 2F:
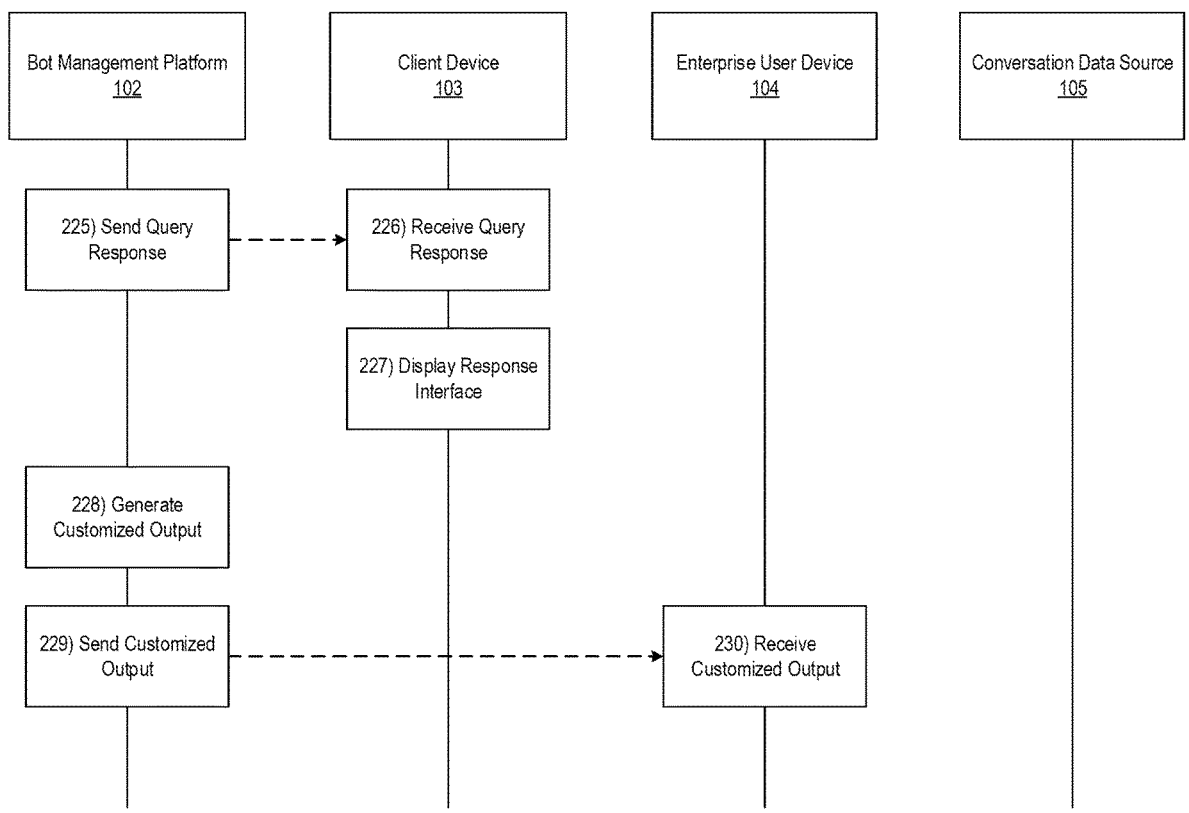

Referring to FIG. 2F, at step 225, the bot management platform 102 may generate a query response based on the query response information and/or the assistance information, and may sent the query response to the client device 103. For example, the bot management platform 102 may send the query response to the client device via the communication interface and while the second wireless data connection is established. In some instances, the bot management platform 102 may also send one or more commands directing the client device 103 to display the query response.

In some instances, in generating the query response, the bot management platform 102 may have performed a content agnostic procedure to this point (e.g., the above described steps may identify base content, but not content that is specifically formatted based on a particular channel (e.g., web, voice, mobile, and/or other channels). Rather, the bot management platform 102 may maintain a content database, and once the query response information and/or the assistance information has been generated, the database may be queried (e.g., by the bot management model, one or more expert bots, or the like) to obtain the specific content for responding to the query. In some instances, this content database may include a single source of truth for content, that may be transformed/converted into multiple versions of content corresponding to each channel, and thus, may provide the correct version of content for responding to the query based on the query response information, assistance information, and/or other information, which may be formatted for receipt by the client device 103. In some instances, the content database may be queried by a plugin manager, which may be integrated into the bot management platform 102. In doing so, when modifications are necessary, the bot management platform 102 may modify a single truth (of the content), which may then be converted to whatever particular output channel is necessary, and may thus enable content maintenance/updates without impacting front-end layers, or duplicative content modifications.

At step 226, the client device 103 may receive the query response. For example, the client device 103 may receive the query response while the second wireless data connection is established. In some instances, the client device 103 may receive the one or more commands directing the client device 103 to display the query response.

At step 227, based on or in response to the one or more commands directing the client device 103 to display the query response, the client device 103 may display the query response. For example, the client device 103 may display a chatbot interface that provides a response to the query 510 (e.g., similar to graphical user interface 505, which is illustrated in FIG. 5). In some instances, in displaying the chatbot interface, the client device 103 may display a video and/or audio file along with, or instead of, providing a text response.

In some instances, the above described steps may be repeated in a loop so as to create a back and forth conversation between a customer and the bot management platform 102.

Figure 8:
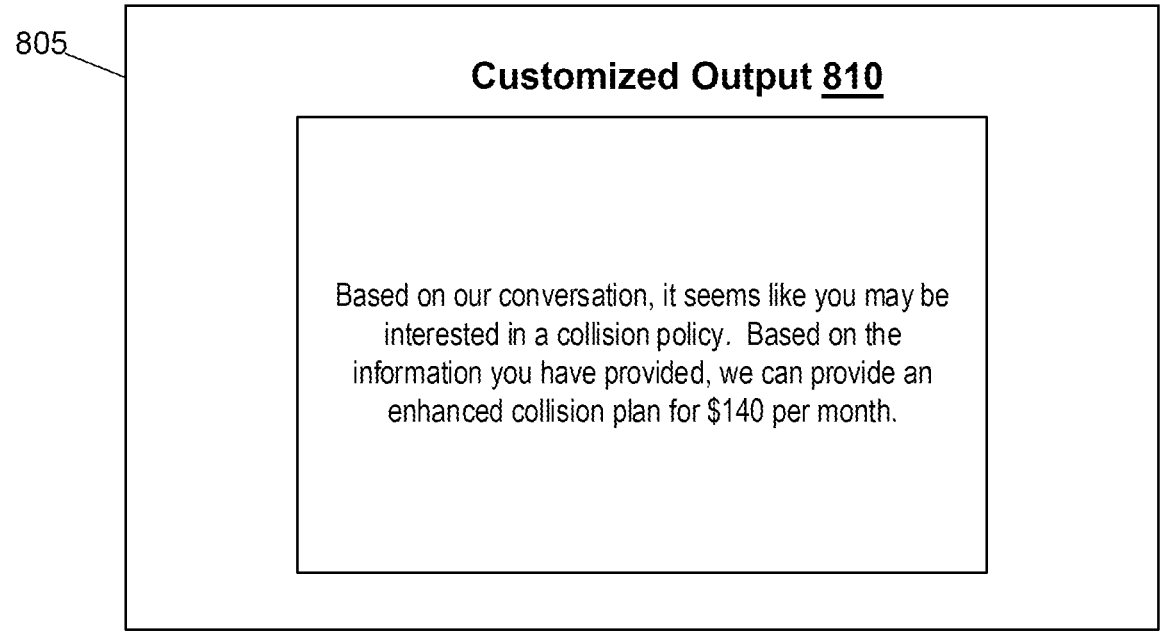

At step 228, the bot management platform 102 may generate, based on the conversation between the user of the client device 103 and the bot management platform 102, a customized output (e.g., the customized output 810 of FIG. 8). For example, the bot management platform 102 may use natural language understanding to classify and extract information from user queries and responses that may be used generate a customized output for the user of the client device 103 (e.g., an insurance quote). For example, based on the information received from the client device 103 in the form of queries and/or other responses to bot generated messages, the bot management platform 102 may generate a quote. In doing so, the bot management platform 102 may effectively automate the process of quote generation, without requiring a customer service or sales representative to be involved. For example, to continue with the above described use case, the bot management platform 102 may generate a quote for collision insurance for the user of the client device 103.

In some instances, rather than merely generating a quote for the user at this time, the bot management platform 102 may communicate with the user to ask whether or not they are interested in receiving a quote. If the user indicates that they are not interested, the bot management platform 102 might not provide a quote. If the user is interested, the bot management platform 102 may prompt for additional information that may be used to refine/customize a quote for the user, and/or may provide a plurality of interfaces that may walk the user through the process of obtaining a quote.

At step 229, the bot management platform 102 may send the customized output to the client device 103. For example, the bot management platform 102 may send the customized output to the client device 103 via the communication interface 113 and while the second wireless data connection is established. In some instances, the bot management platform 102 may also send one or more commands directing the client device 103 to display the customized output.

At step 230, the client device 103 may receive the customized output. For example, the client device 103 may receive the customized output while the second wireless data connection is established. In some instances, the client device 103 may also receive the one or more commands directing the client device 103 to display the customized output.

Figure 2G:
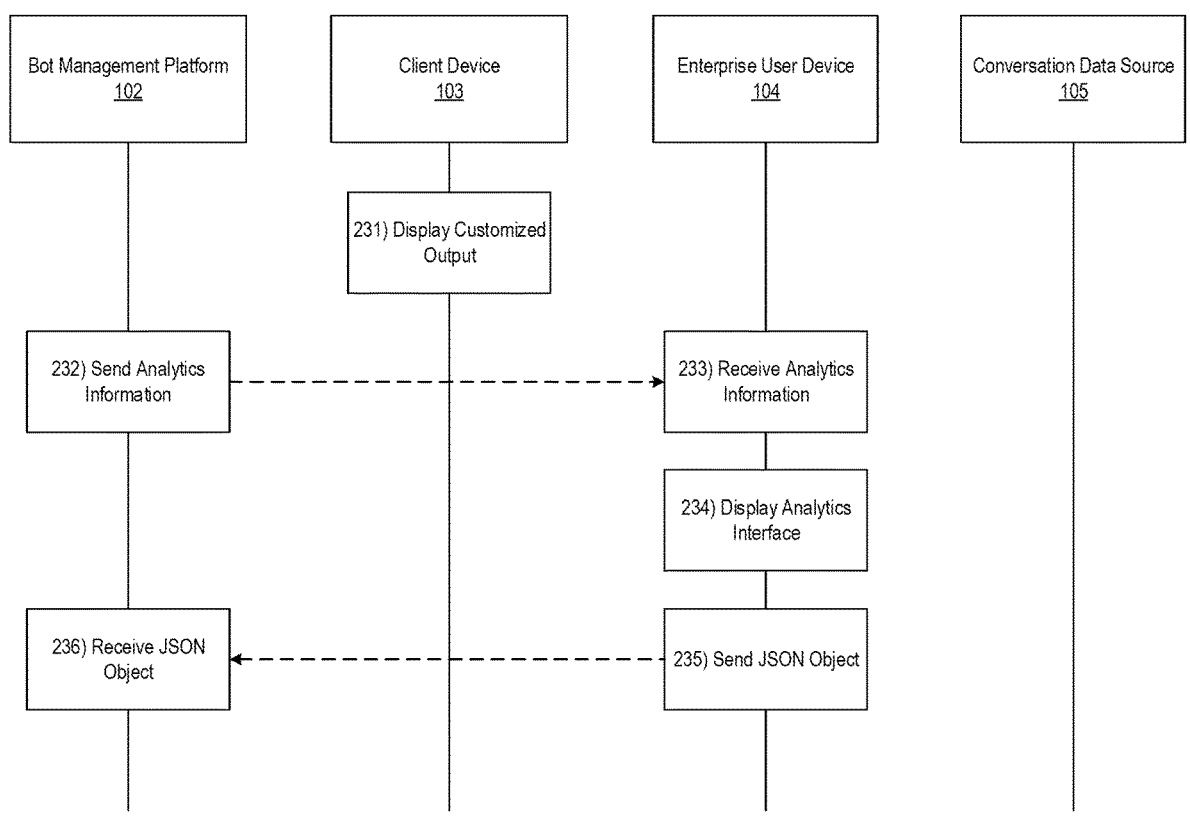

Referring to FIG. 2G, at step 231, based on or in response to the one or more commands directing the client device 103 to display the customized output, the client device 103 may display the customized output. For example, the client device 103 may display a graphical user interface similar to graphical user interface 805, which is shown in FIG. 8, and that includes a personalized quote for the user of the client device 103.

At step 232, the bot management platform 102 may generate multi-layer analytics that may be used to further refine the machine learning models. For example, the bot management platform 102 may generate analytics indicating user satisfaction with the chatbot experience described above, and may send this analytics information to the enterprise user device 104. In some instances, these analytics may include a multi drill-down analysis that may include analysis of various models, sub-models, classifications, sub-classifications, and/or other aspects of the chatbot experience. As a specific example, the bot management platform 102 may identify that although the correct expert model was selected by the bot manager model, the selected expert bot did not correctly answer the query. Thus, this corresponding expert bot may need to be further refined, whereas the bot manager model may need to be further re-enforced for making the correct determination.

Additionally or alternatively, the bot management platform 102 may identify/generate analytics that may inform business decisions. For example, the chatbot experiences may be analyzed to identify customer experiences leading to termination of a policy and/or other customer actions/reactions. More specifically, the bot management platform 102 may identify, at a first level, a user intent to terminate a policy. Then, at a second level, the bot management platform 102 may identify why the user intends to terminate the policy. This may help to inform business decisions regarding customer retention and/or provide other insights.

In some instances, the bot management platform 102 may send this analytics information to the enterprise user device 104 while the third wireless data connection is established. In some instances, the bot management platform 102 may also send one or more commands directing the enterprise user device 104 to display an analytics interface.

At step 233, the enterprise user device 104 may receive the analytics information. For example, the enterprise user device 104 may receive the analytics information while the third wireless data connection is established. In some instances, the enterprise user device 104 may also receive the one or more commands directing the enterprise user device 104 to display the analytics interface.

Figures 6, 7:
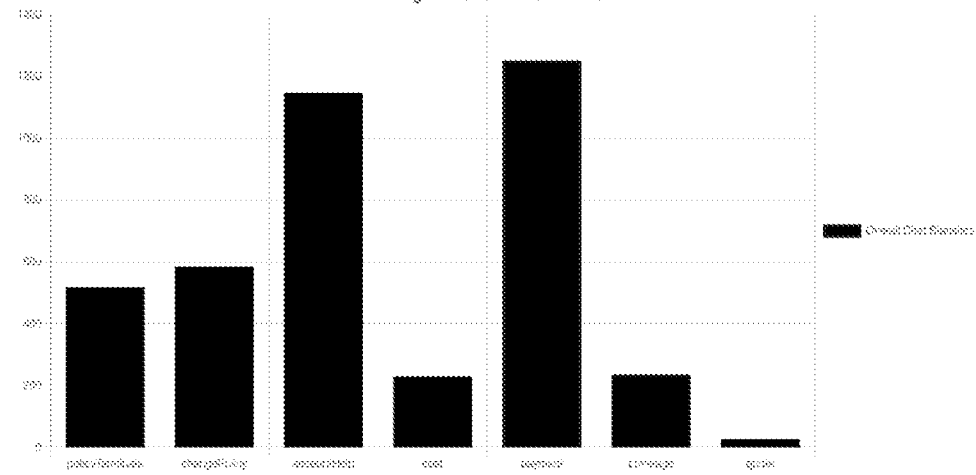

At step 234, based on or in response to the one or more commands directing the enterprise user device 104 to display the analytics interface, the enterprise user device 104 may display an analytics interface. For example, the enterprise user device 104 may display a graphical user interface similar to graphical user interface 605 or 705, which are illustrated in FIGS. 6 and 7. For example, a user of the enterprise user device 104 may view numeric representations computed based on the chatbot interactions such as "user journey red flags," "flight risk customers," and/or other insights, and then may select "more detail" to identify chatbot interactions indicative of the analytics/numeric representations/insights. In some instances, the enterprise user device 104 may display these analytics as a graph or chart, which may indicate corresponding classifications made by the models (and which, in some instances, may be accessed as a further level of drill down analytics).

At step 235, the enterprise user device 104 may receive a configuration update for one or more of the above described models, which may comprise, for example, a JSON object created by a user of the enterprise user device 104. In these instances, the enterprise user device 104 may send the JSON object to the bot management platform 102 (e.g., while the third wireless data connection is established). In some instances, the configuration update received by the enterprise user device 104 might not require bot creation and/or training expertise. Rather, just JSON objects may be created by business and/or other industry professionals.

At step 236, the bot management platform 102 may receive the JSON object sent at step 235. For example, the bot management platform 102 may receive the JSON object via the communication interface 113 and while the third wireless data connection is established.

Figure 2H:
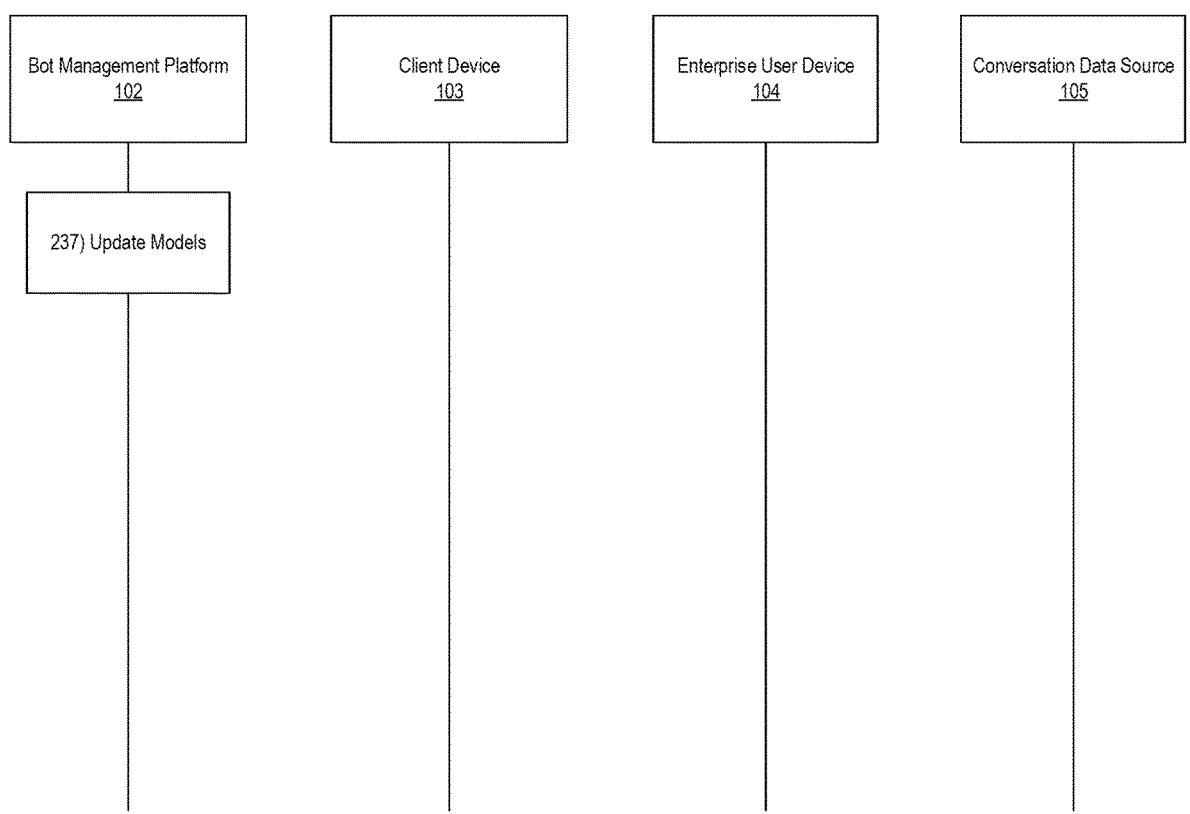

Referring to FIG. 2H, at step 237, the bot management platform 102 may update the model generated at step 201 by storing the received JSON object. In doing so, the bot management platform 102 may effectively plug a configuration and/or other update into the models without requiring widespread recoding (e.g., the models may now just access the newly stored JSON object).

In some instances, any of the above described user interfaces may be made up of a plurality of user interface components that may be updated by the bot management platform 102 without updating the remaining components of a corresponding page. In some instances, this may cause the bot management platform 102 to automatically update one or more of the remaining components. In some instances, the bot management platform 102 may maintain links between parent and child pages, so as to automatically update parent or child pages when the corresponding parent or child pages are updated. In doing so, the bot management platform 102 may reduce backend programming efforts to update content on a page and/or its corresponding parent/child pages.

Figure 3:
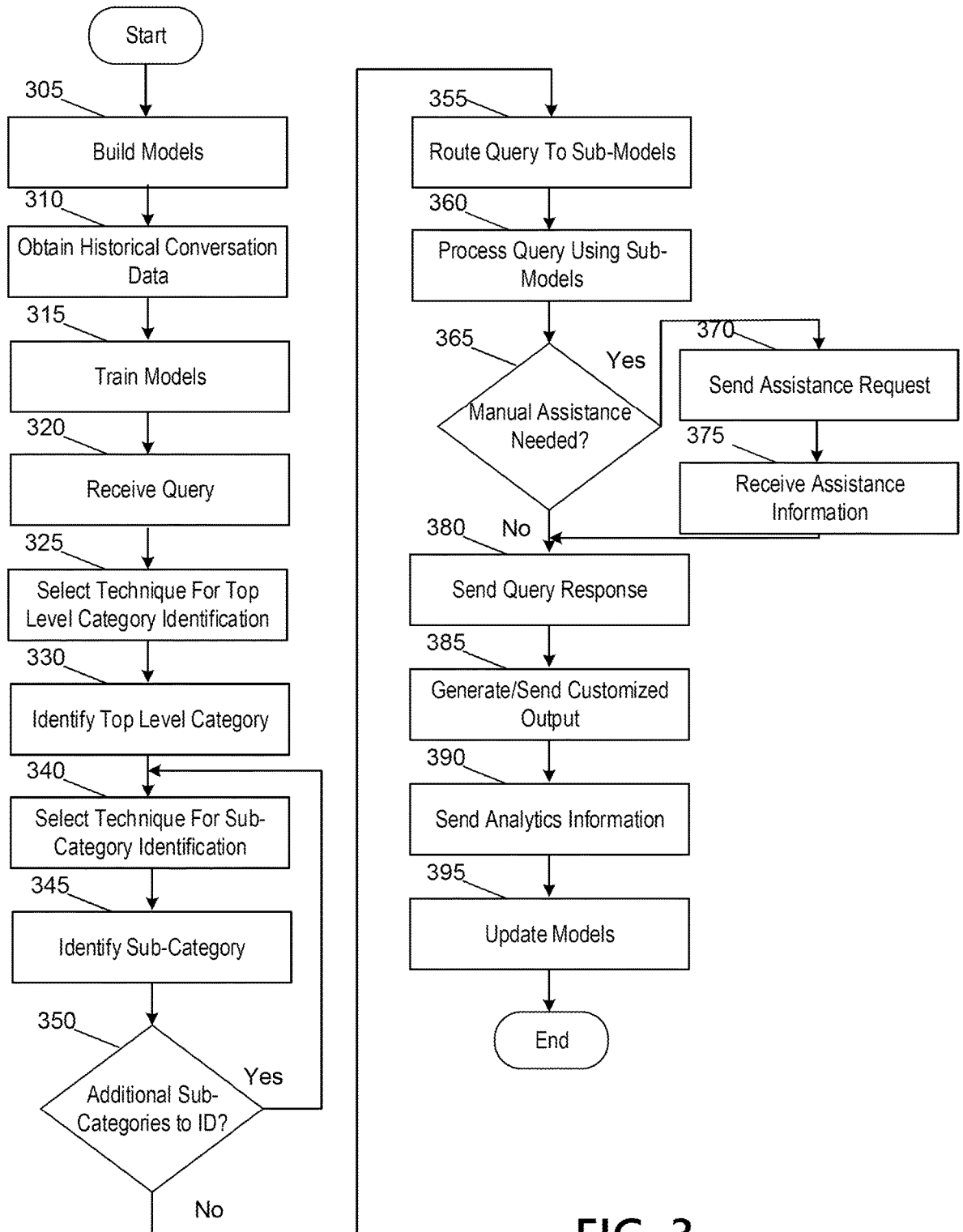
FIG. 3 depicts an illustrative method for using interconnected bot networks for task distribution in accordance with one or more example embodiments.

FIG. 3 depicts an illustrative method for using interconnected bot networks for task distribution in accordance with one or more example embodiments. Referring to FIG. 3, at step 305, a computing platform having at least one processor, a communication interface, and a memory may build one or more models. At step 310, the computing platform may obtain historical conversation data. At step 315, the computing platform may train the one or more models. At step 320, the computing platform may receive a query. At step 325, the computing platform may start to analyze and parse the query via selection of a technique for top level category identification. At step 330, the computing platform may identify a top level category. At step 340, the computing platform may select a technique for sub-category identification. At step 345, the computing platform may identify a sub category. At step 250, the computing platform may identify whether additional sub-categories are to be identified. If so, the computing platform may return to step 340. If not, the computing platform may proceed to step 355.

At step 355, the computing platform may route the query to one or more sub-models. At step 360, the computing platform may process the query using the selected sub-models. At step 365, the computing platform may identify whether manual assistance is needed to respond to the query. If not, the computing platform may proceed to step 380. If so, the computing platform may proceed to step 370.

At step 370, the computing platform may send an assistance request to an enterprise user device. At step 375, the computing platform may receive assistance information. At step 380, the computing platform may send a query response to a client device. At step 385, the computing platform may generate and send a customized output to the client device. At step 390, the computing platform may send analytics information to the enterprise user device. At step 395, the computing platform may update the one or more models.

According to an embodiment, a chatbot system 106 in a computing environment 100 is configured to display a customized output 810 (e.g., via step 385 of FIG. 3) on graphical user interface 805 (FIG. 8). Such a chatbot system 106 as described herein may work across and in multiple Artificial Intelligence ("AI") services to sufficiently answer the inquiries at a level sufficient to supple answers as described herein. The chatbot system may include a plurality of machine learning models 114 and a plurality of chatbots 115 stored in a memory 112, each of the plurality of machine learning models 114 corresponding to a respective chatbot 115 of the plurality of chatbots 115, and a computing platform 102 (e.g., as the bot management platform 102) in the computing environment 100. The computing platform may include a processor 111, a non-transitory computer-readable memory 112 communicatively coupled to the processor 111, and machine-readable instructions stored in the memory 112.

The machine-readable instructions, when executed by the processor 111, cause the processor 111 of the computing platform 102 to: receive a query (e.g., in step 320 of FIG. 3) comprising a content from a graphical user interface of a user of a client device 103 as part of a conversation between the user of the client device 103 and the computing platform 102, route the query (e.g., in step 355) to one or more selected models 114 of the plurality of machine learning models 114 based on the content of the query such that the query is routed to one or more selected chatbots 115 of the plurality of chatbots 115, and generate a response to the query 510 (e.g., in steps 360-380), using the one or more selected models 114 and corresponding one or more selected chatbots 115, as part of the conversation between the user of the client device 103 and the computing platform 102. In embodiments, the query may include an inquiry regarding a type of insurance, and the response to the query 510 may include information regarding the type of insurance to address the inquiry. The type of insurance may include collision insurance, rental insurance, homeowners insurance, other automobile insurance, other vehicular insurance, or other suitable types of insurance. In a non-limiting example, the type of insurance may include collision insurance, and the customized output 810 may include a quote for collision insurance.

The machine-readable instructions, when executed by the processor, further cause the processor 111 of the computing platform 102 to: automatically generate, based on the conversation between the user of the client device 103 and the computing platform 102 and the response to the query 510, the customized output 810 (e.g., in step 385) for the user, the customized output 810 for the user separate from the response to the query 510, and display the customized output 810 for the user on the graphical user interface of the client device 103 of the user.

In embodiments, the response to the query 510 may be displayed on the graphical user interface (e.g., the graphical user interface 505 of FIG. 5) of the client device 103 of the user. Additionally or alternatively, prior to display of the customized output 810, a prompt to the user may be generated on the graphical user interface (e.g., the graphical user interface 805 of FIG. 8) requesting approval to display the customized output, and, based on receiving approval from the user via the prompt on the graphical user interface 805, the customized output 810 may be displayed on the graphical user interface 805.

In embodiments, prior to generation of the customized output 810, a prompt may be generated to the user on the graphical user interface 805 requesting approval to generate the customized output 810. Based on receiving approval from the user via the prompt on the graphical user interface 805, an information prompt to the user may be generated on the graphical user interface 805 requesting information from the user. Based on the information from the user received via the information prompt, the customized output 810 may be generated for the user. In embodiments, a plurality of interface screens may be generated on the graphical user interface 805 to display as the information prompt to the user on the graphical user interface 805 requesting information from the user, and information may be received from the user via the plurality of interface screens. Each interface screen may request information from the user to generate the customized output 810.

In a non-limiting aspect, an acceptance or a declination from the user may be received with respect to an offer for a service associated with the customized output 810. Based on receipt of the acceptance of the user with respect to the offer associated with the customized output 810, the computing platform 802 may proceed to generate the service for the user. A confirmation of the service to the user may be displayed on the graphical user interface 805. By way of example, and not as a limitation, the officer for the service may be a quote for an insurance policy of a type of insurance, and the acceptance may be acceptance of the quote such that the insurance policy as the service may be generated and confirmed to the user via the graphical user interface 805. In embodiments, In another aspect, a quote may be generated as the customized output 810 based on the conversation and the response to the query 510. The quote may be displayed as the customized output 810 on the graphical user interface (e.g., such as on the graphical user interface 805 of FIG. 8) of the client device 103 of the user. Prior to display of the quote, a prompt to the user may be generated on the graphical user interface (e.g., the graphical user interface 805) requesting approval to display the quote. Based on receiving approval from the user via the prompt on the graphical user interface 805, the quote may be displayed on the graphical user interface 805. In embodiments, the quote may be customized based on a type of property, such as an age of a vehicle for collision insurance, a maximum value for a policy, or combinations thereof. The quote may further be separated into different options ranked between higher and lower level tiers of coverage. Certain types of coverage may be added or removed from the quote (for example, bodily injury may be removed from a collision insurance quote while property damage liability, collision deductible, and collision coverage may be retained). In embodiments, a comprehensive coverage option may be opted to be added by the user.

In embodiments, a computing platform machine learning model 114 corresponding to the computing platform 102 may be trained (e.g., in step 315) to route queries to one or more of the plurality of machine learning models 114 based on the respective content of the queries, and to route the query (e.g., in step 355) to one or more selected models 114 of the plurality of machine learning models 114 based on the computing platform machine learning model 114 as trained. Additionally or alternatively, each of the plurality of machine learning models 114 may be trained on one or more topics to be associated with the corresponding chatbot 115 of the plurality of chatbots 115, an association may be generated between the content of the query and the one or more topics for at least one chatbot 115 of the plurality of chatbots 115, and the query may be routed (e.g., in step 355) to the at least one chatbot 115 based on the association and the respective trained machine learning model 114 corresponding to the at least one chatbot 115.

The response to the query 510 may be displayed to the user on the graphical user interface (e.g., the graphical user interface 505 of FIG. 5), and a prompt for the user may be generated to determine whether the response to the query is an acceptable total response or an unacceptable total response, which prompt may be displayed to the user. A response to the prompt may be received from the user via the graphical user interface 505. When the response to the prompt is indicative that the response to the query is the unacceptable total response, an assistance request for assistance information may be sent to an enterprise user device 104. The assistance information may be received based on the assistance request from the enterprise user device 104, and the response to the query to the user may be displayed on the graphical user interface (e.g., via the graphical user interface 405 of FIG. 4) based on the assistance information. A follow-up prompt for the user may be generated to determine whether the response to the query 510 based on the assistance information is the acceptable total response or the unacceptable total response, the follow-up prompt may be displayed to the user, and a response to the follow-up prompt may be received from the user.

When the response to the prompt is indicative that the response to the query 510 is the unacceptable total response, another assistance request for further assistance information may be sent to the enterprise user device 104. The further assistance information based on the another assistance request may be received from the enterprise user device 104. The response to the query 510 to the user may be displayed on the graphical user interface 505 based on the further assistance information.

When the response to the prompt is indicative that the response to the query 510 is the acceptable total response, a completion notification for the response to the query 510 may be generated. The completion notification may be sent to the enterprise user device 104, and the completion notification may be displayed on the graphical user interface (e.g., the graphical user interface 505) of the client device 103. The further assistance information based on the another assistance request may be received from the enterprise user device 104, and the response to the query 510 to the user may be displayed on the graphical user interface (e.g., the graphical user interface 505) based on the further assistance information.

In an alternative or additional embodiment, the chatbot system 106 may be configured to analyze query data and may include the plurality of machine learning models 114 and the plurality of chatbots 115 stored in the memory 112. Such query analysis may occur through multiple intelligent and/or technical platforms, such as chat, voice, text, html, ALEXA, or other like platforms. Each of the plurality of machine learning models 114 correspond to a respective chatbot 115 of the plurality of chatbots 115, and the computing platform 102 may include the processor 111, the non-transitory computer-readable memory 112 communicatively coupled to the processor 111, and machine-readable instructions stored in the memory 112 that, when executed by the processor 111, cause the computing platform 102 to receive a query comprising a content from a graphical user interface of a user of a client device 103 as part of a conversation between the user of the client device 103 and the computing platform, and parse the query to identify at least a category and a sub-category (e.g., steps 325-350 of FIG. 3) corresponding to the query. The query be may be routed (e.g., in step 355) to one or more selected models 114 of the plurality of machine learning models 114 based on the content of the query and the at least a category and a sub-category that are identified such that the query is routed to one or more selected chatbots 115 of the plurality of chatbots 115. A response to the query 510, using the one or more selected models 114 and corresponding one or more selected chatbots 115, may be generated as part of the conversation between the user of the client device 103 and the computing platform 102. The response to the query 510 may be displayed to the user on the graphical user interface of the client device 103 of the user.

Using a first machine learning technique associated with a machine learning model 114 for the computing platform 1-2, a top level category may be identified (e.g., in step 330) as the category corresponding to the query. The top level category may be one of a plurality of categories, and the top level category may have a highest category ranking as a match to the query. Using a second machine learning technique associated with the machine learning model 114 for the computing platform 102, the second machine learning technique different from the first machine learning technique, the sub-category corresponding to the query may be identified (e.g., in steps 345-350) and may have a highest sub-category ranking as a match to the query. In embodiments, the top level category and the sub-category may be identified based on a number of utterances corresponding to the query, labeled data corresponding to the query, unlabeled data corresponding to the query, or combinations thereof.

The top level category may be associated with a type of insurance, and the sub-category may be associated with one or more requirements for the type of insurance.

In additional or alternative aspects, a prompt to the user may be generated on the graphical user interface requesting a rating of the response to the query 510, and analytics may be generated (e.g., in steps 232-234 of FIG. 2 and steps 385-390 of FIG. 3) based on the rating of the response to the query 510 and historical data. The analytics may comprise a knowledge base based on tree structure, and may support classifying in the AI hierarchy, general questions to specific question, classification of questions from general questions down through layers of questions, mapping of the knowledge base to a tree for use by AI, AI classification as an agent to navigate the knowledge base, and the like. The analytics may be displayed on a graphical user interface of the enterprise client device 104. The analytics displayed on the graphical user interface (e.g., graphic user interfaces 605, 705 of FIGS. 6-7) of the enterprise client device 104 may include information regarding whether the user is a flight risk such that the user may be likely discontinue a service based on the rating and the historical data. Other data mapping such likelihood of flight risk may place users in categories such as likelihood to or actual action to: go to a competitor, sell assets, reinstate a policy, make a payment, have coverage, and/or obtain a quote via a chat.

In further additional or alternative aspects, a configuration update (e.g., in steps 235-237 of FIG. 2 and step 395 of FIG. 3) may be received for a selected model 114 of the plurality of machine learning models 114 via an enterprise user device 104. The selected model 114 based on the configuration update may be updated without affecting the other models of the plurality of machine learning models 114. The configuration update may be a JavaScript Object Notation (JSON) object created by a user of an enterprise client device, and the selected model 114 may be updated based on storing the JSON object such that additional coding is not required to update the selected model 114. In embodiments, the chatbot system 106 may work within a single bot system with a single bot to implement a configuration update to update a model 114 associated within a bot 116 outside a bot network. The configuration update may be directed to retrieving a high intent from the questions (e.g., queries) to get the answers (e.g., response to the queries) dynamically without hardcoding the answers, extracting the information from the question, and mapping to the underlying Application Programming Interface ("API"). In an aspect, a policy number may be from a question and used to look up the policy in a back end system independent of the question.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A chatbot system configured to analyze query data, the chatbot system comprising:
 a plurality of machine learning models and a plurality of chatbots, each of the plurality of machine learning models corresponding to a respective chatbot of the plurality of chatbots; and
 a computing platform comprising a processor, a non-transitory computer-readable memory communicatively coupled to the processor, and machine-readable instructions stored in the memory that, when executed by the processor, cause the processor of the computing platform to, across at least one or more intelligent platforms, technical platforms, or combinations thereof:

parse a query comprising a content to identify at least a category and at least a first sub-category and a second sub-category, each associated with the category corresponding to the query;

route the query to at least two selected models of the plurality of machine learning models based on the content of the query and the at least the first sub-category and the second sub-category that are identified such that the query is routed to at least two selected chatbots of the plurality of chatbots, wherein the query is routed to a first selected chatbot of the at least two selected chatbots based on the first sub-category as identified and the query is routed to the a second selected chatbot different from the first selected chatbot based on the second sub-category as identified;

generate a response to the query, using the at least two selected models and corresponding at least two selected chatbots, as part of a conversation between a user of a client device and the computing platform;

display the response to the query;

generate a prompt to the user on a graphical user interface of the client device requesting a rating of the response to the query;

generate analytics based on the rating of the response to the query and historical data;

display the analytics on a graphical user interface of an enterprise client device; and train the at least two selected models of the plurality of machine learning models by generating an association between the analytics and the at least two selected chatbots.

2. The chatbot system of claim 1, wherein the machine-readable instructions further, when executed by the processor, cause the processor of the computing platform to:

train a computing platform machine learning model corresponding to the computing platform to route queries to one or more of the plurality of machine learning models based on the respective content of the queries; and route the query to the at least two selected models of the plurality of machine learning models based on the computing platform machine learning model as trained.

3. The chatbot system of claim 1, wherein the machine-readable instructions further, when executed by the processor, cause the processor of the computing platform to:

train each of the plurality of machine learning models on one or more topics to be associated with the corresponding chatbot of the plurality of chatbots;

generate an association between the content of the query and the one or more topics for at least one chatbot of the plurality of chatbots;

route the query to the at least one chatbot based on the association and the respective trained machine learning model corresponding to the at least one chatbot.

4. The chatbot system of claim 1, wherein the machine-readable instructions further, when executed by the processor, cause the processor of the computing platform to:

identify, using a first machine learning technique associated with a first machine learning model for the computing platform, a top level category as the category corresponding to the query, the top level category being one of a plurality of categories, the top level category having a highest category ranking as a match to the query; and identify, using a second machine learning technique associated with a second machine learning model for the computing platform different from the first machine learning model, the second machine learning technique different from the first machine learning technique, a plurality of sub-categories corresponding to the query, and having a highest sub-category ranking the first sub-category and the second sub-category having respectively a first highest sub-category ranking and a second highest sub-category ranking as a match to the query.

5. The chatbot system of claim 4, wherein the machine-readable instructions further, when executed by the processor, cause the processor of the computing platform to:

identify the top level category and the first sub-category and the second sub-category based on a number of utterances corresponding to the query, labeled data corresponding to the query, unlabeled data corresponding to the query, or combinations thereof, wherein the top level category is associated with a type of insurance, and each of the first sub-category and the second sub-category is associated with one or more requirements for the type of insurance.

6. The chatbot system of claim 1, wherein the analytics displayed on the graphical user interface of the enterprise client device comprise information regarding whether the user is a flight risk such that the user may discontinue a service based on the rating and the historical data.

7. The chatbot system of claim 1, wherein the machine-readable instructions further, when executed by the processor, cause the processor of the computing platform to:

receive a configuration update for a selected model of the plurality of machine learning models via an enterprise user device; and update the selected model based on the configuration update without affecting the other models of the plurality of machine learning models.

8. The chatbot system of claim 7, wherein the configuration update comprises a JavaScript Object Notation (JSON) object created by a user of an enterprise client device, and the selected model is updated based on storing the JSON object such that additional coding is not required to update the selected model.

9. The chatbot system of claim 1, wherein the machine-readable instructions further, when executed by the processor, cause the processor of the computing platform to:

generate a plurality of interface screens on a graphical user interface of the client device to display as an information prompt to the user on the graphical user interface requesting information from the user; and receive information from the user via the plurality of interface screens, each interface screen requesting information from the user to generate the response to the query.

10. The chatbot system of claim 1, wherein the machine-readable instructions further, when executed by the processor, cause the processor of the computing platform to:

receive the query comprising the content from a graphical user interface of the user of the client device as part of the conversation between the user of the client device and the computing platform; and display the response to the query to the user on the graphical user interface of the client device of the user.

11. The chatbot system of claim 1, wherein the query comprises an inquiry regarding a type of insurance, and the response to the query comprises information regarding the type of insurance to address the inquiry.

12. The chatbot system of claim 11, wherein the type of insurance comprises collision insurance.

13. The chatbot system of claim 12, wherein the machine-readable instructions further, when executed by the processor, cause the processor of the computing platform to:
generate a customized output comprising a quote for collision insurance based on the response to the query; and
display the customized out comprising the quote on a graphical user interface of the client device.

14. The chatbot system of claim 1, wherein the machine-readable instructions further, when executed by the processor, cause the processor of the computing platform to:
generate a prompt for the user to determine whether the response to the query is an acceptable total response or an unacceptable total response;
display the prompt to the user;
receive a response to the prompt from the user;
when the response to the prompt is indicative that the response to the query is the unacceptable total response, send an assistance request for assistance information to an enterprise user device;
receive the assistance information based on the assistance request from the enterprise user device; and
display the response to the query to the user on a graphical user interface of the client device based on the assistance information.

15. The chatbot system of claim 14, wherein the machine-readable instructions further, when executed by the processor, cause the processor of the computing platform to:
generate a follow-up prompt for the user to determine whether the response to the query based on the assistance information is the acceptable total response or the unacceptable total response;
display the follow-up prompt to the user; and
receive a response to the follow-up prompt from the user.

16. The chatbot system of claim 15, wherein the machine-readable instructions further, when executed by the processor, cause the processor of the computing platform to:
when the response to the prompt is indicative that the response to the query is the unacceptable total response, send another assistance request for further assistance information to the enterprise user device;
receive the further assistance information based on the another assistance request from the enterprise user device; and
display the response to the query to the user on the graphical user interface of the client device based on the further assistance information.

17. The chatbot system of claim 15, wherein the machine-readable instructions further, when executed by the processor, cause the processor of the computing platform to:
when the response to the prompt is indicative that the response to the query is the acceptable total response, generate a completion notification for the response to the query;
send the completion notification to the enterprise user device;
display the completion notification on the graphical user interface of the client device;
receive the assistance information based on the assistance request from the enterprise user device; and
display the response to the query to the user on the graphical user interface based on the assistance information.

18. A chatbot system configured to analyze query data, the chatbot system comprising:
a plurality of machine learning models and a plurality of chatbots, each of the plurality of machine learning models corresponding to a respective chatbot of the plurality of chatbots; and
a computing platform comprising a processor, a non-transitory computer-readable memory communicatively coupled to the processor, and machine-readable instructions stored in the memory that, when executed by the processor, cause the processor of the computing platform to:
receive a query comprising a content from a graphical user interface of a user of a client device as part of a conversation between the user of the client device and the computing platform,
parse the query to identify at least a category and at least a first sub-category and a second sub-category, each associated with the category corresponding to the query;
route the query to at least two selected models of the plurality of machine learning models based on the content of the query and the at least the first sub-category and the second sub-category that are identified such that the query is routed to at least two selected chatbots of the plurality of chatbots, wherein the query is routed to a first selected chatbot of the at least two selected chatbots based on the first sub-category as identified and the query is routed to the a second selected chatbot different from the first selected chatbot based on the second sub-category as identified;
generate a response to the query, using the at least two selected models and corresponding at least two selected chatbots, as part of the conversation between the user of the client device and the computing platform;
generate a prompt to the user on the graphical user interface requesting a rating of the response to the query;
generate analytics based on the rating of the response to the query and historical data;
display the analytics on a graphical user interface of an enterprise client device;
train the at least two selected models of the plurality of machine learning models by generating an association between the analytics and the at least two selected chatbots.

19. A method of operating a chatbot system to analyze query data, the chatbot system comprising a plurality of machine learning models and a plurality of chatbots, each of the plurality of machine learning models corresponding to a respective chatbot of the plurality of chatbots, and a computing platform, the method comprising:
receiving a query comprising a content from a graphical user interface of a user of a client device as part of a conversation between the user of the client device and the computing platform,
parsing the query to identify at least a category and at least a first sub-category and a second sub-category, each corresponding to the query;
routing the query via the computing platform to at least two selected models of the plurality of machine learning models based on the content of the query and the at least the first sub-category and the second sub-category that are identified such that the query is routed to at least two selected chatbots of the plurality of chatbots, wherein the query is routed to a first selected chatbot of the at least two selected chatbots based on the first sub-category as identified and the query is routed to the a second selected chatbot different from the first selected chatbot based on the second sub-category as identified;

generating a response to the query, using the at least two selected models and corresponding at least two selected chatbots, as part of the conversation between the user of the client device and the computing platform;

displaying the response to the query to the user on the graphical user interface of the client device of the user;

generating a prompt to the user on a graphical user interface of the client device requesting a rating of the response to the query;

generating analytics based on the rating of the response to the query and historical data;

displaying the analytics on a graphical user interface of an enterprise client device; and training the at least two selected models of the plurality of machine learning models by generating an association between the analytics and the at least two selected chatbots.

* * * * *